Oct. 19, 1937.  T. R. McGOWAN  2,096,462
BRAKE MECHANISM
Filed May 21, 1936  2 Sheets-Sheet 2
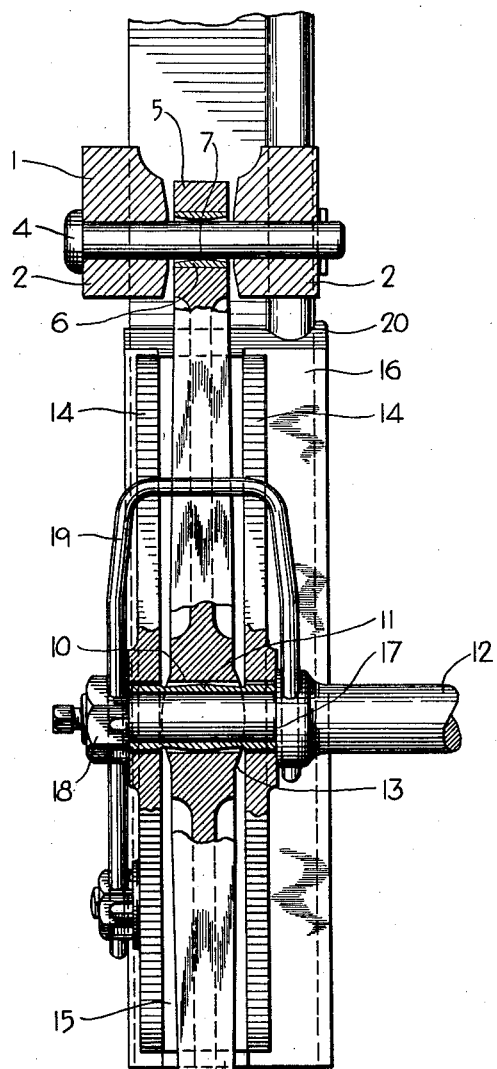
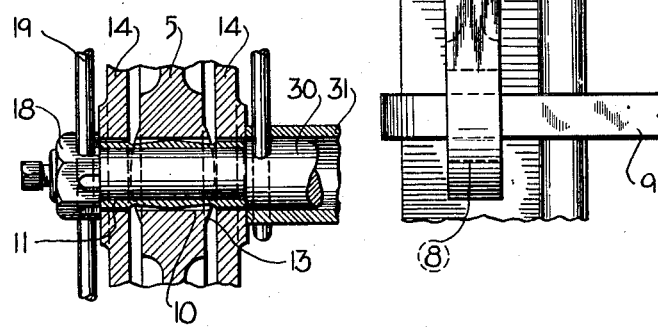
INVENTOR
THOMAS R. McGOWAN
BY *Wm. M. Cady*
ATTORNEY Patented Oct. 19, 1937

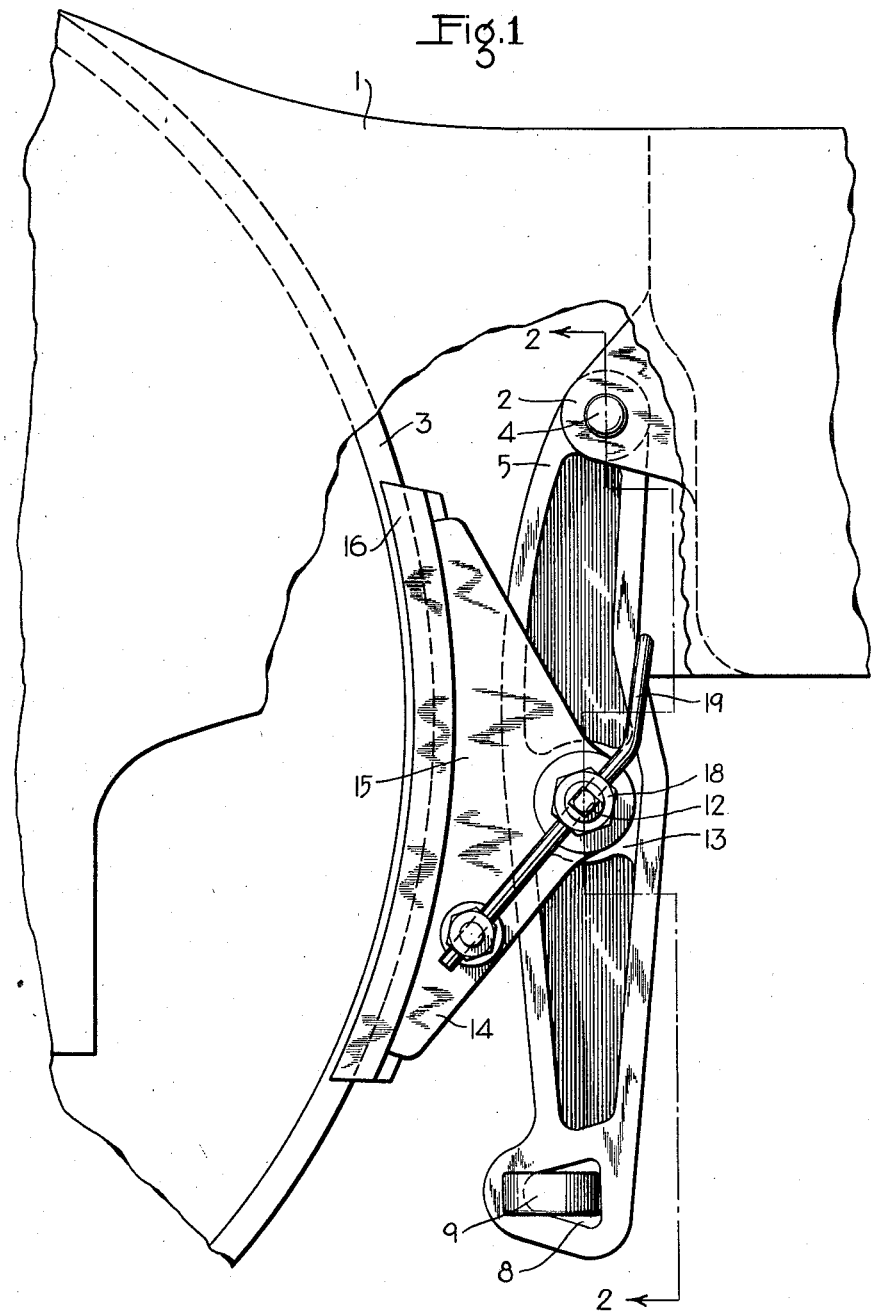

2,096,462

UNITED STATES PATENT OFFICE 2,096,462

BRAKE MECHANISM

Thomas R. McGowan, Pittsburgh, Pa., assignor to The American Brake Company, Wilmerding, Pa., a corporation of Missouri Application May 21, 1936, Serial No. 80,994

8 Claims. (Cl. 188—206)

This invention relates to brake rigging for railway rolling stock and more particularly to a locomotive brake rigging which is carried by the locomotive frame or a locomotive truck.

At the present time there is a growing tendency in designing and building locomotives to permit certain wheels and axles to move in directions transversely of the locomotive frame so that the wheels will follow the track rails on curves without undue friction between the flanges of the wheels and the rails. On a locomotive where such a wheel assembly is employed, the usual brake rigging has been found to be very objectionable for the reason that since the usual operating clearance in the connections between the levers and the frame and between the levers and the brake shoes is not sufficient to permit the free movement of these parts with the wheels as they move transversely of the frame, the wheels act, through the medium of the brake shoes and brake shoe heads to place heavy lateral strains on the brake levers and the connections between the brake shoe heads and levers and between the levers and locomotive frame. As a result of this the brake shoes as well as the operative connections between the brake shoes and the locomotive frame are subject to excessive and uneven wear.

To eliminate the aforementioned difficulties it has heretofore been proposed to slidably mount the upper ends of the brake levers on the locomotive frame in such a manner as to move bodily with the wheels as they move laterally of the locomotive frame but this proved to be unsatisfactory for the reason that as the wheels move laterally the levers, instead of sliding bodily as intended, tilted and bound on their support and thereby prevented their desired bodily movement, and as a consequence this construction was objectionable for the same reasons as mentioned in connection with the usual brake rigging.

The principal object of the invention is to provide a brake rigging which will be free of the aforementioned objectionable features.

This object is attained by mounting the upper ends of the brake levers on the locomotive frame in such a manner as to permit the levers to rock in directions transversely of the frame, and by providing a rocking connection between the brake shoes and levers.

In the accompanying drawings Fig. 1 is a side elevational view of a portion of a locomotive frame and a brake rigging embodying the invention; Fig. 2 is a vertical sectional view of the same taken on the line 2—2 of Fig. 1; and Fig. 3 is a fragmentary sectional view illustrating a modified tie rod connection between brake shoe heads.

In the drawings only those parts of the brake rigging are shown that are deemed necessary to a clear understanding of the invention and the following description will be more or less limited to the parts shown.

In the present embodiment of the invention the brake rigging is shown in conjunction with a locomotive frame which may comprise a side member 1 having a pair of spaced lugs 2 arranged at one side of and in vertical alignment with, but spaced away from, a locomotive wheel 3 which is mounted on one end of the usual axle (not shown) in a well known manner. Although not shown it will be understood that a corresponding wheel is mounted on the other end of the axle.

Extending across the space between the spaced lugs 2 and supported at its ends by the lugs is a pin 4 on which the upper end of a vertically disposed hanger type of brake lever 5 is pivotally mounted to swing toward and away from the tread of the wheel 3 and to rock back and forth in directions transversely of the locomotive frame, the lever being provided with a bushing 6 having a convex inner surface 7 which is in engagement with the pin 4 and which provides for the transverse rocking movement of the lever.

The lower end of the lever 5 is provided with an opening 8 for the reception of one end of a transversely extending lever 9 through the medium of which the lever 5 is moved toward and away from the wheel 3. In some brakes instead of operating the lever 5 through the medium of the lever 9 it will be apparent that it may be operated through the medium of a brake beam which may be connected to the lever 5 in any desired manner.

The lever 5, intermediate its ends is provided with an opening 10 for the reception of a tubular bushing 11 which is mounted on the adjacent end of a tie bar 12 which extends transversely of the locomotive frame. The lever is provided on each side with an annular boss 13 having a convex exterior surface in the form of a portion of a sphere which encircles the opening 10.

The bushing 11 projects beyond each side of the lever 5 and at its ends has journalled thereon spaced lugs 14 which constitute a part of a brake shoe head 15 which is interposed between the lever 5 and the tread of the wheel 3 and which carries a brake shoe 16 adapted to frictionally engage said tread. The lugs 14 of the brake shoe head are arranged one on each side of the lever 5, there being an operating clearance provided between the lever and the outermost portion of the spherical surface of each of the bosses 13.

The diameter of the outer surface of that portion of the bushing which is located within the opening 10 of the lever 5 gradually reduces from the center of the length of this portion of the bushing toward its ends, the lever being adapted to engage that portion of the surface which is of the greatest diameter.

The tie bar 12 is provided with a collar 17 against which the brake shoe is held in slidable engagement by a castle nut 18 having screw-threaded connection with the outer end of the tie bar which projects beyond the outer end of the bushing 11.

Operatively engaging the lever 5, tie rod 12 and brake shoe head 15 is a balancing spring 19 which is provided for the purpose of maintaining the brake shoe head from tilting toward the wheel when the brakes are released, thereby preventing the brake shoe from dragging on the tread of the wheel. Besides balancing the brake shoe head as just described the spring 19 serves to lock the nut against accidental rotation relative to the tie bar.

In the present embodiment of the invention the brake shoe is provided with an arcuate groove 20 which is open to the tread engaging face of the shoe for the reception of a portion of the flange of the wheel 3. When the wheel moves in a direction transversely of the locomotive frame the flange acts on the inner surface of the groove to move the brake shoe, brake head and tie bar 12 in the same direction, so that the shoe will be automatically maintained in its proper position with the tread of the wheel in a direction transversely of the frame.

In operation, when the wheel moves laterally it causes the brake shoe and brake head to move in the same direction. The brake head as it is thus being moved causes the lever 5 to rock in a direction transversely of the frame on the pin 4 carried by the frame. It will here be noted that as the lever is thus being moved at an angle to its normal position, the rocking connection between the lever and bushing 11 permits the brake head to remain in its proper aligned position with relation to the wheel 3 without any binding tendency between the lever and brake head.

It will be understood from the foregoing description that by rockably mounting the hanger lever 5 for free movement in directions transversely of the locomotive frame and by providing a freely rockable connection between the brake head and the lever, the brake head and shoe will remain in their proper aligned relationship with the tread of the wheel 3 regardless of the angular position of the lever, thus effectively preventing uneven and excessive wear of the brake shoe and the pivotal connections between the lever and the brake head and locomotive frame.

The construction shown in Fig. 3 is for the most part identical with that of the construction shown in Figs. 1 and 2, the only difference being in the means for tying the brake head and hanger lever located at one side of the locomotive frame to the corresponding brake head and hanger lever located at the other side of the frame. As shown this means comprises a tie bar 30 which has an annular shoulder which serves as an abutment for one end of the bushing 11 and further comprises a metal tube 31 which surrounds the tie bar and at each end forms a thrust bearing for the brake head. The operation of this construction is identical with that of the construction shown in Figs. 1 and 2.

While two illustrative embodiments of the invention have been described in detail, it is not my intention to limit its scope to these embodiments or otherwise than by the terms of the appended claims.

Having now described my invention, what I claim as new and desire to secure by Letters Patent, is:

1. In a brake rigging, in combination, a frame, a frame supporting wheel movable transversely of said frame, a brake element movable into and out of braking engagement with the tread of said wheel and movable transversely of said frame with said wheel, a brake lever operatively carried by said frame for moving said element into and out of braking engagement with said tread, and means operatively connecting said lever and element providing an automatically adjustable joint adapted to permit relative rocking movement between the lever and element in directions transversely of said frame.

2. In a brake rigging, in combination, a frame, a frame supporting wheel movable transversely of said frame, a brake element movable into and out of braking engagement with the tread of said wheel and movable transversely of said frame with said wheel, a brake lever pivotally carried by said frame for moving said element into and out of braking engagement with the tread of said wheel, said lever being rockable relative to said frame to swing in a direction transversely of the frame, and means operatively connecting said lever and element adapted to provide for relative rocking movement between said lever and element in a direction transversely of said frame.

3. In a brake rigging, in combination, a frame, a frame supporting wheel movable transversely of said frame, a brake element movable into and out of braking engagement with the tread of said wheel and movable transversely of said frame with said wheel, a brake lever pivotally carried by said frame for moving said element into and out of braking engagement with the tread of said wheel, said lever being rockable relative to said frame to swing in a direction transversely of the frame, and means operatively connecting said lever and element adapted to permit said lever to assume an angular position relative to said element upon movement of said element in the direction transversely of said frame.

4. In a brake rigging, in combination, a frame, a frame supporting wheel movable in a direction transversely of said frame, a brake element movable by said wheel, a brake lever carried by said frame and rockable on said frame by said element when the element is moved by said wheel, and means operatively connecting said element and lever together, said means providing a joint to permit said lever when rocked by said element to assume an angular position with relation to the element.

5. In a brake rigging, in combination, a frame, a frame supporting wheel movable in a direction transversely of said frame, a brake element movable by said wheel, a brake lever carried by said frame and rockable on said frame by said element when the element is moved by said wheel, and means operatively connecting said element and lever together, said means providing a joint to permit said lever when rocked by said element to assume an angular position without tending to move said element at an angle to its normal position with relation to the tread of said wheel.

6. In a brake rigging, in combination, a frame, a frame supporting wheel movable in a direction transversely of said frame, a brake element movable by said wheel, a brake lever carried by said frame and rockable on said frame by said element when the element is moved by said wheel, and means operatively connecting said element and lever together, said means providing a joint to permit said lever when rocked by said element to assume an angular position without tending to move said element relative to said wheel.

7. In a brake rigging, in combination, a frame, a frame supporting wheel movable in directions transversely of the frame, a brake element movable in directions longitudinally of the frame into and out of braking engagement with said wheel and movable with said wheel in directions transversely of the frame, a lever carried by said frame for actuating said element into and out of braking engagement with said wheel and being rockable transversely of the frame by said element, and means forming a pivotal connection between said element and lever for preventing said lever as it is rocked from tending to move said element relative to said wheel.

8. In a brake rigging, in combination, a frame, a frame supporting wheel movable in directions transversely of the frame, a brake element movable in directions longitudinally of the frame into and out of braking engagement with said wheel and movable with said wheel in directions transversely of the frame, a lever carried by said frame for actuating said element into and out of braking engagement with said wheel and being rockable transversely of the frame by said element, and means operatively connecting said element and lever, said means providing for free relative movement between said element and lever in directions transversely of the frame.

THOMAS R. McGOWAN.